United States Patent [19]

Arackellian et al.

[11] Patent Number: 4,820,911
[45] Date of Patent: Apr. 11, 1989

[54] APPARATUS FOR SCANNING AND READING BAR CODES

[75] Inventors: Kevork Arackellian, Rochester; John A. Boles, Fishers; Jay M. Eastman, Pittsford, all of N.Y.

[73] Assignee: Photographic Sciences Corporation, Rochester, N.Y.

[21] Appl. No.: 884,683

[22] Filed: Jul. 11, 1986

[51] Int. Cl.$^4$ .............................................. G06K 7/10
[52] U.S. Cl. .................................... 235/467; 235/462; 235/472; 250/566; 350/6.8
[58] Field of Search ............... 235/462, 467, 463, 472; 250/566; 350/6.7, 6.8

[56] References Cited

U.S. PATENT DOCUMENTS

| 4,105,926 | 8/1978 | Reno et al. | 250/566 |
| 4,294,506 | 10/1981 | Hattori | 350/6.8 |
| 4,318,583 | 3/1982 | Goshima et al. | 350/6.8 X |
| 4,387,297 | 6/1983 | Swartz et al. | 235/462 |
| 4,441,019 | 4/1984 | Hardy | 250/237 R |
| 4,450,350 | 5/1984 | Hardy | 235/467 |
| 4,560,862 | 12/1985 | Eastman et al. | 235/472 X |
| 4,603,262 | 7/1986 | Eastman et al. | 250/566 |
| 4,623,791 | 11/1986 | Kaneko et al. | 250/234 |
| 4,742,220 | 5/1988 | Beyor | 235/462 X |

Primary Examiner—Philip H. Leung
Attorney, Agent, or Firm—Martin LuKacher

[57] ABSTRACT

An improved bar code scanning and reading apparatus which is adapted to be hand-held utilizes anamorphic optics for scanning and reading the code by providing a beam having an oblong cross-section in the nominal plane of the code. The oblong cross-section may be aligned with the bars of the code. The optics does not focus the beam in the longitudinal direction of the cross-section at the nominal plane of the code so that diffraction effects which would otherwise cause rotation of the cross-section of the beam to a position transverse to the bars of the code which would preclude reading of narrow bars, is avoided. The last lens of the anamorphic system may be a cylindrical lens which provides a line focus of a visible marker beam while at the same time providing the oblong cross-section of the beam which scans the code. The light from the vicinity of the code passes through the cylindrical lens and is collected by a toric reflector which projects the incoming light onto a photodetector. Power for operating the source of the scanning beam (a laser diode) is conserved by an opto-electronic system responsive to the movement of the sectors of a rotating beam deflector (a polygon reflector) so as to enable power to be applied to the laser only during the intervals when the beam is disposed within the limits of its scan path.

47 Claims, 11 Drawing Sheets

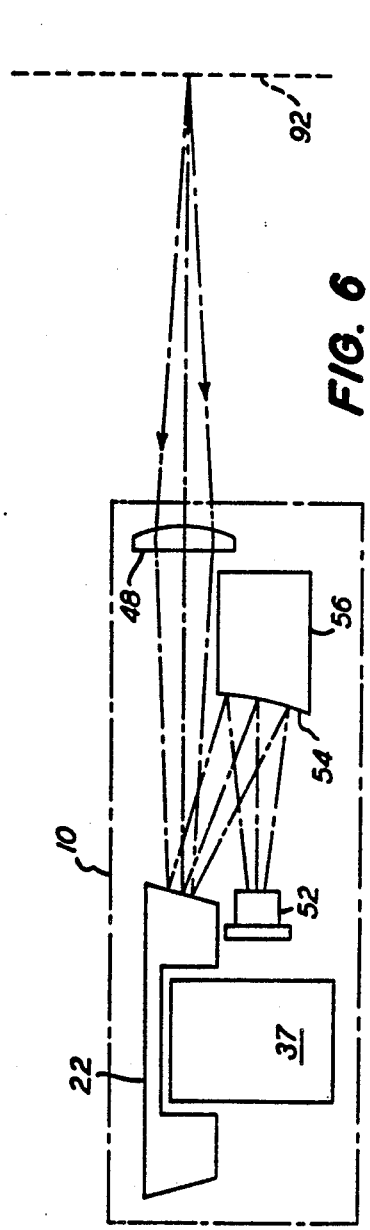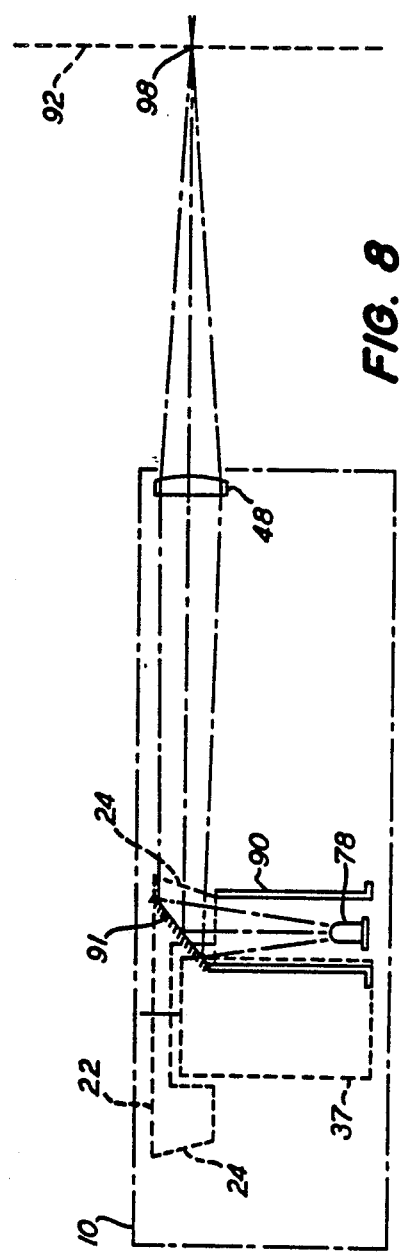

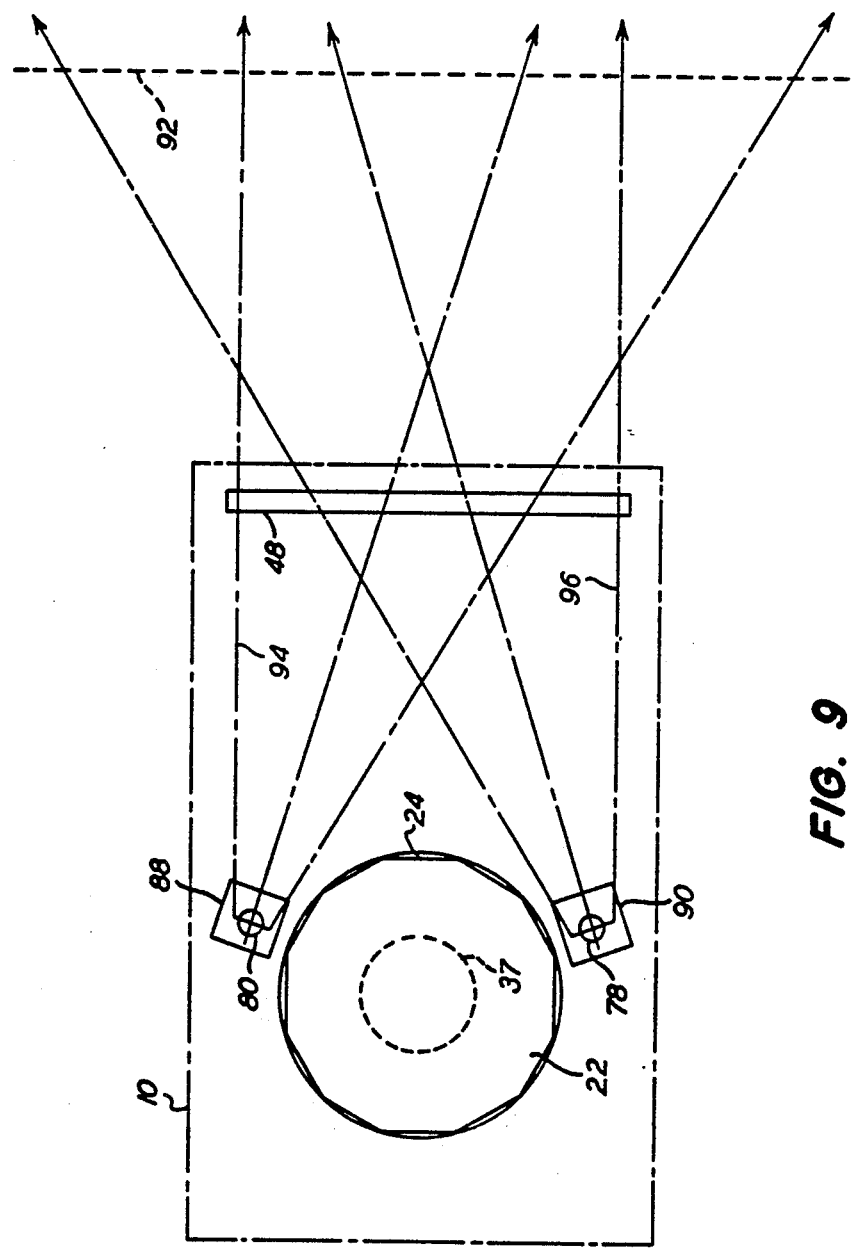

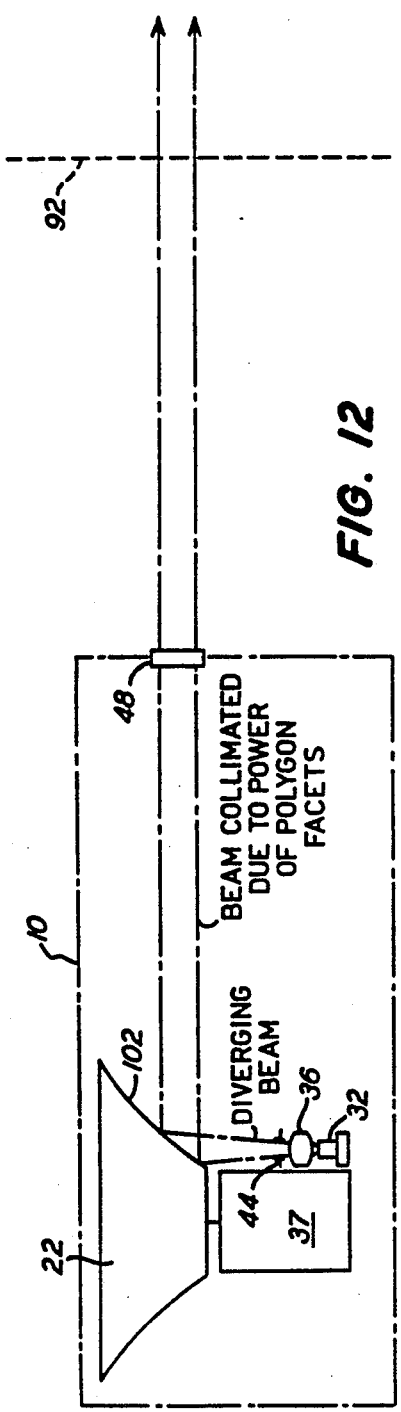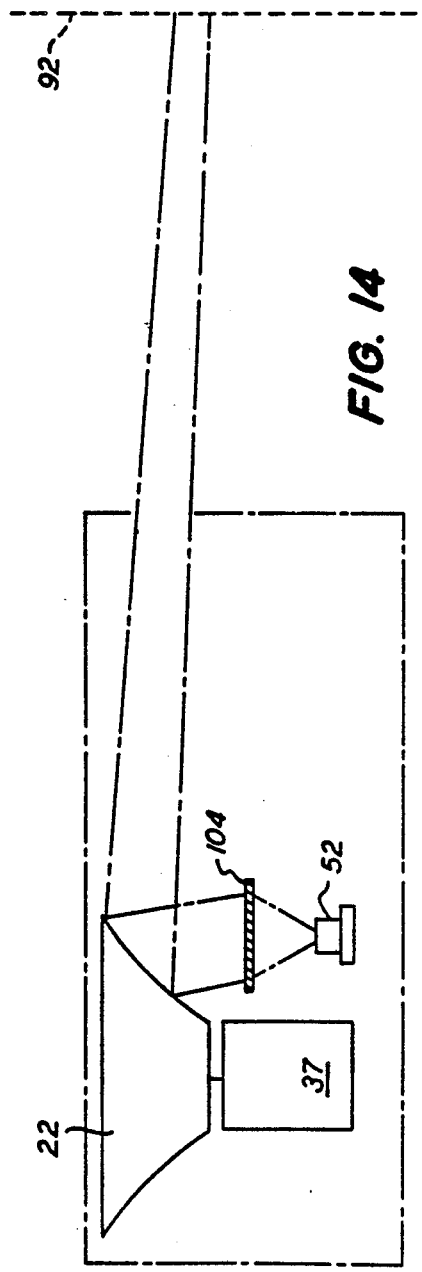

APPARATUS FOR SCANNING AND READING BAR CODES

DESCRIPTION

The present invention relates to bar code scanning and reading apparatus and particularly to an improved bar code scanner having optics which enhances the efficiency and reliability of reading of bar codes.

The invention is especially suitable for use in a hand-held bar code scanner by means of which a laser beam is scanned across a scan path which is adapted to be aligned perpendicularly to the bars of the code and provides an optical laser beam of a cross-sectional shape which is less susceptible to defects in the code and yet is capable of resolving narrow bars and spaces. The invention is also especially suitable for use where the beam which sweeps across the code is an invisible laser beam, such as generated by a laser diode. The invention provides a visible marker beam which defines a line congruent with the scan path of the invisible laser beam so that the operator can readily align the invisible laser beam with the bars of the code to be read. The invention also provides improvements in the sensing of the presence or absence of reflected light from the code by providing optics which may integrated with the optics for scanning the laser beam and assembled therewith in a compact structure especially suitable for use in a housing which is adapted to be hand-held. The invention is also especially suitable for use in portable bar code scanners having self-contained power sources, such as batteries and provides means for conserving power for limiting the time during which the laser is supplied with power to turn it on to the time when the beam is adapted to sweep within the length of its scan path.

Various types of bar code scanning and reading apparatus (also known as bar code sensors) have been proposed and have been put into use. Among which are bar code scanning and reading apparatus which have been provided by certain of the inventors hereof and are the subject of U.S. Pat. No. 4,560,862 issued to J. M. Eastman and John A. Boles on Dec. 24, 1985 and U.S. Pat. No. 4,603,262 issued on July 29, 1986 to J. M. Eastman and John A. Boles (U.S. application ser. No. 525077, filed Aug. 22, 1983). These apparatus are designed to produce a beam of generally circular cross-section in the nominal plane of the bar code which is of diameter small enough to resolve narrow bars and spaces. A bar code printed with its bars in the vertical direction carries information in the horizontal direction. The length of each bar adds redundancy to the information carried in the horizontal direction. Bar codes printed using dot matrix printers or other low quality printing techniques will often have printing defects such as voids, gaps or other blemishes. It has been proposed to sweep the code with a beam having an elliptical cross-section which is less susceptible to defects than a round cross-section of the same width. It has also been proposed to use the inherently elliptical beam emitted by a laser diode (see U.S. Pat. No. 4,387,297 issued June 7, 1983, columns 19 and 20). The disadvantage of the approach proposed in this patent is that the major axis of the cross-section rotates 90 degrees as the plane of observation moves from one side of the focus to the focal plane. The focal plane is designed to be the nominal plane of the bar code which is being sensed. Consequently, the field of view in the nominal or target plane where the laser beam is focused can become wider than the bars or spaces to be resolved. The signals which are sensed are distorted and the efficiency of reading (how many sweeps are required before the code is read) is reduced. Other optical systems can be used to generate oblong or elliptically shaped beams, for example, slit apertures or anamorphic optics using cylindrical lenses. However, such systems which are practically useful in a bar code scanner in which a deflecting element, such as a rotating polygon, sweeps the beam, particularly a coherent optical (laser) beam, have not been available.

It has been discovered in accordance with the invention that an anamorphic optical system can be provided which creates an oblong or elliptical beam cross-section in the nominal plane of the code, which does not rotate to a position where its major axis is out of alignment with the bars of the code, by avoiding a focus along the major axis (in the tangential plane of the beam) at the nominal plane of the code and providing a focus along the major axis far beyond the nominal plane or providing for a beam which diverges along a path through the nominal plane. Another focus which defines the minor axis (in the sagittal plane of the beam) or waist of the beam is provided in the nominal plane. The field of view defined by the focused beam is sufficiently narrow to resolve codes having fine bars and spaces. The elements of the anamorphic system, for example a cylindrical lens, which defines the major axis of the cross-section and which can focus the beam far beyond the nominal plane of the code, is located beyond the deflector. The rotation of the major and minor axis of the beam, as it scans the code, is minimized by reducing the angle of incidence of the beam on the deflector. Resolution of the code is therefore high, even for fine bars.

In bar code scanners using invisible beams, such as provided by laser diodes, a visible marker beams coincident with the laser beams may be generated. In the above referenced patent No. 4,603,262, a visible marker beam system enables the laser to be scanned across the bar code by moving a housing in which the laser and the lamp which provides the source of the visible beam and their associated optics are disposed. The problem is exacerbated when the invisible laser beam is swept across a scan path in that a marker beam as disclosed in the above referenced patent then merely provides a spot which does not denote the orientation or length of the scan path. The invention provides an improved marker beam system which generates a line congruent with the scan path and, when the scanning beam is oblong, can provide a line or bar congruent with the scan path and centered with respect to the length of the scanning beam.

In accordance with the invention, the anamorphic optics which collimates or diverges the beam in its tangential plane and can provide the focus far beyond the nominal plane of the code (preferably a cylindrical lens which provides the last lens of the anamorphic optical system), focuses a visible light beam to produce a line or bar congruent with the scan path of the laser beam. The cylindrical lens, therefore, provides a dual function in that it participates in the shaping of the laser beam and also provides the marker beam line.

The collection of light scattered from the bar code at a photodetector which provides the signal from which the bar code may be decoded is difficult in compact bar code readers which are adapted to be hand-held by reason of the limited space which is available. Increasing the intensity of the illumination of the photodetector with the scattered light from the code increases the efficiency of reading of the bar codes and is highly desirable. It is desirable, therefore, to avoid the use of beam splitters which introduce losses and reduce the intensity of the light going to the photodetector. The problem is further exacerbated through the use of a deflector system having anamorphic optics for shaping the beam to enhance its ability to read blemished bar codes.

In accordance with the invention, the photodetector is provided with collecting optics which are integrated with the anamorphic optical system. A collecting reflector with different powers in orthogonal directions (e.g., having a toric reflecting surface) is provided in the path of the beam between the laser source and the deflector. An aperture through the reflecting surface allows the passage of the output laser beam. The scattered light is collected by the reflector and imaged on the photodetector, thereby increasing the illumination of the photodetector with the scattered light from the code. The signal to noise ratio of the signal provided by the photodetector is therefore enhanced.

In portable hand-held scanners, the source which provides the scanning beam, such as a laser diode, is the element of the system which consumes the most power. In order to conserve the life of batteries and provide reliable operation for a long time and reduce the frequency of battery replacement or recharging, the invention makes use of the deflector to effectively gate-on the laser beam only during the period of time while the beam is being swept along the scan path. The deflector may be a polygon or other device (e.g., a hologon) having light deflecting or reflecting facets. Radial ribs from the axis of rotation of the deflector to the facets are of such width that the limits of the scan path are defined between the ribs. Opto-electronic means are responsive to light interrupted by the ribs and generate a control signal which gates-on and off the power supplied to the laser source. The laser source is then enabled to generate the beam only within the confines of the scan path. The duty cycle of the laser is reduced thereby conserving power.

It is the principal object of the present invention to provide improved bar code sensors (bar code scanning and reading apparatus) wherein the foregoing problems, difficulties and disadvantages are obviated.

It is a still further object of the present invention to provide improved bar code reading apparatus capable of resolving narrow bars and spaces of the code and which is nevertheless tolerant of defects, voids and other blemishes in the printing of the code.

It is a still further object of the present invention to provide improved bar code scanning apparatus which generates an oblong beam which may be aligned with the bars of the code.

It is a still further object of the present invention to provide improved bar code scanning apparatus having a marker beam system which generates a marker beam along a line or bar congruent with the scan path of the beam (which may be invisible) and which scans and illuminates the bar code.

It is a still further object of the present invention to provide improved bar code scanning and reading apparatus in which light scattered from the code is collected in a manner to enhance the signal to noise characteristic of the electrical signal which is detected by the apparatus.

It is a still further object of the present invention to provide an improved bar code scanner having rotating facets for deflecting the beam across the scan path to illuminate the code and which utilizes the rotation of the facets to gate power for activating the light source which generates the scanning beam thereby conserving power consumed by the apparatus.

Briefly described, a bar code scanning apparatus which provides a beam shape for enhancing the resolution of the bar code in spite of blemishes of the code, has a deflector which deflects the optical beam which illuminates the code along a scan path in a nominal plane to intersect the bars of the code in that plane. An anamorphic optical system is provided having a plurality of optical elements. These elements provide a first astigmatic focus in the sagittal plane of the beam and in the nominal or target plane of the code, and a second orthogonal astigmatic focus in the tangential plane of the beam which is alignable generally paralleling the bars of the code. The second focus is located far beyond the plane of the code. By the second focus is meant an optical effect which provides a beam which is collimated or diverging where it crosses the nominal plane of the code.

The foregoing and other objects, features and advantages of the invention as well as the presently preferred embodiment thereof, will become more apparent from a reading of the following description in connection with the accompanying drawings in which:

FIGS. 6 and 7 are, respectively, elevational and plan views illustrating the operation of the optics used in the apparatus shown in FIGS. 1 and 2 in collecting light scattered from the bar code.

Figure 10:
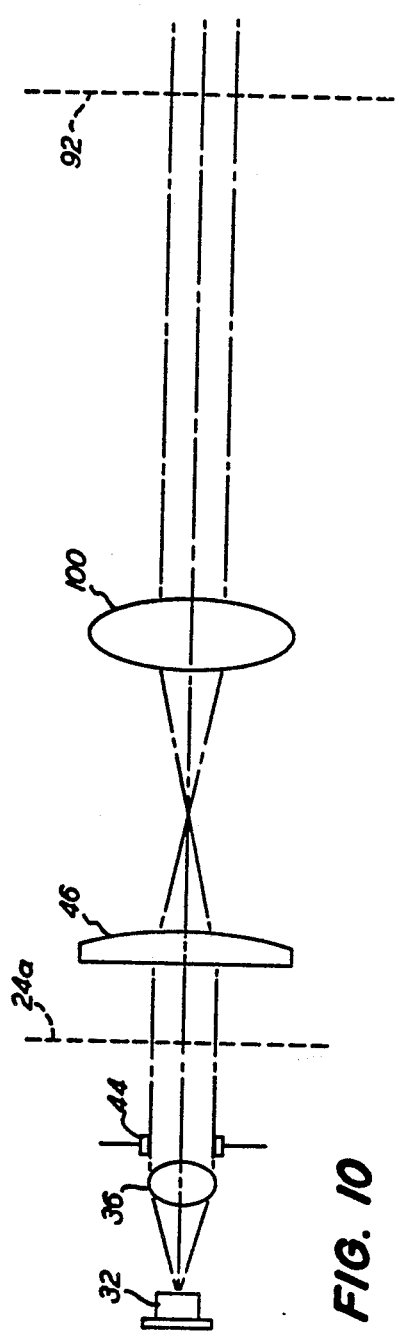
Figure 11:
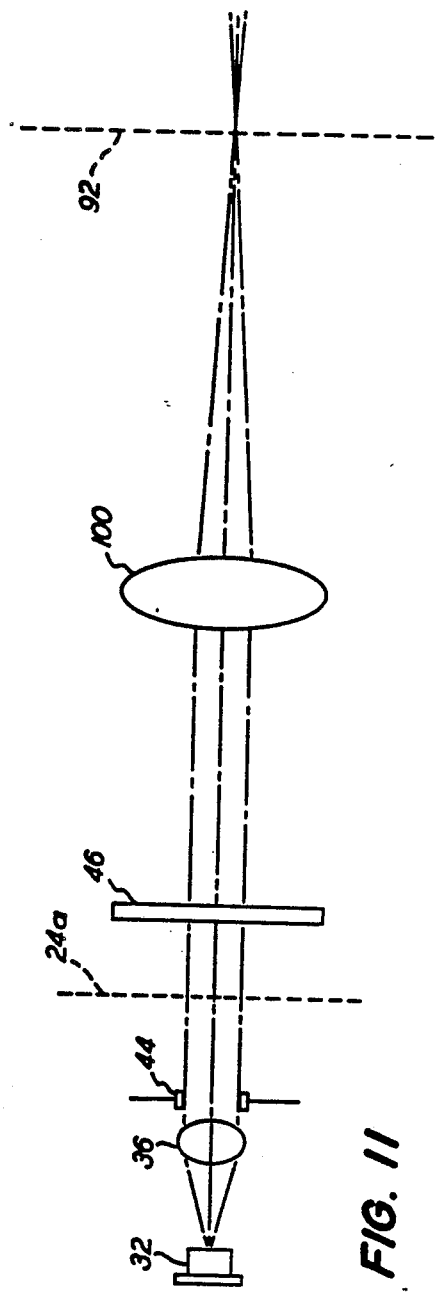
Figure 13:
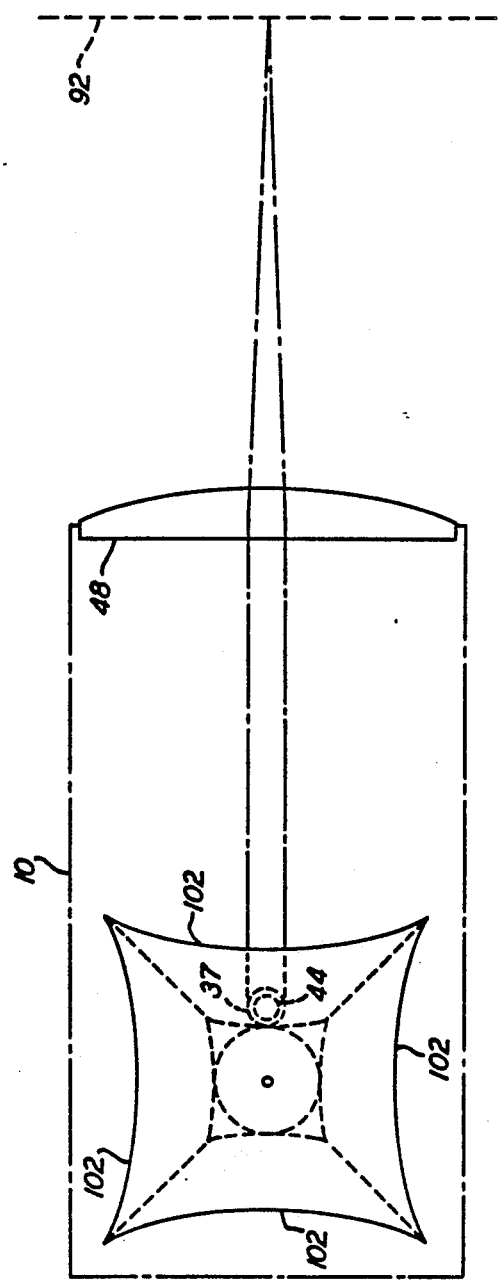
Figure 15:
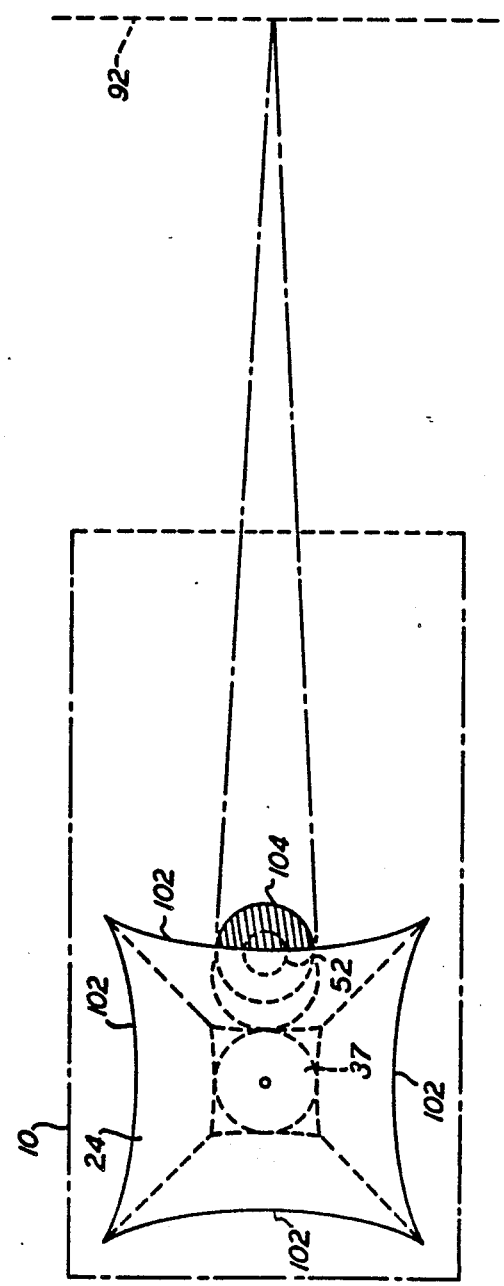
Figure 16:
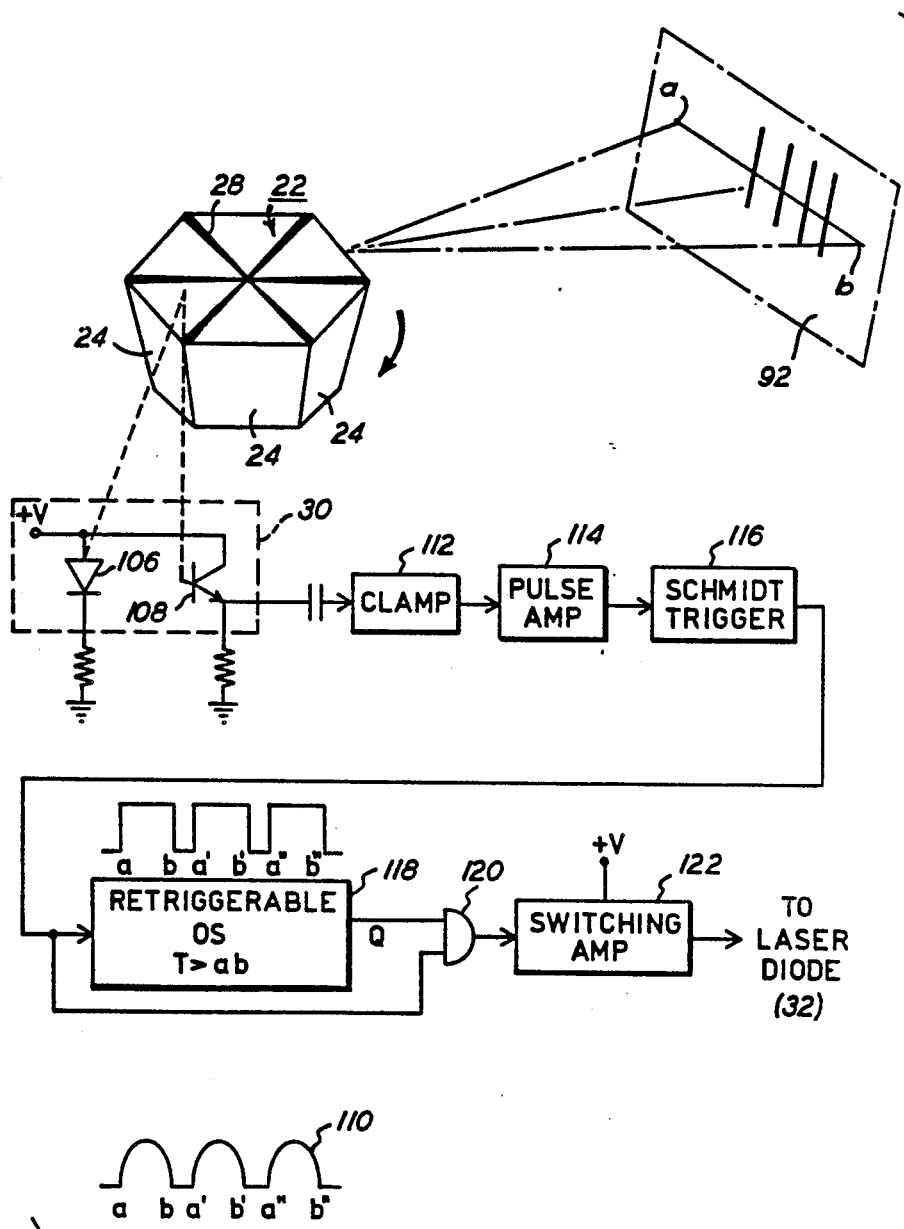

FIGS. 8 and 9, respectively, show in a simplified manner the operation of the optics which form the marker beam along a line or bar congruent with the scan path of the laser beam which illuminates the bar code;

FIGS. 10 and 11 are, respectively, simplified elevational and plan views illustrating the formation of a beam having a generally elliptical shape using anamorphic optics in accordance with another embodiment of the invention;

FIGS. 12 and 13, respectively, are simplified elevational and plan views illustrating a system for generating a beam having a generally elliptical shape in the nominal plane of the bar code and using anamorphic optics in accordance with still another embodiment of the invention;

FIGS. 14 and 15 are elevational and plan views of the system shown in FIGS. 12 and 13 which illustrate the optics, omitted from FIGS. 12 and 13, for collecting the light scattered from the bar code; and FIG. 16 is a schematic diagram illustrating the system for limiting the power to the laser which provides the beam which scans the bar code and conserves power by gating or switching on the laser diode only during the time that the beam is confined to its scan paths.

Figure 1:
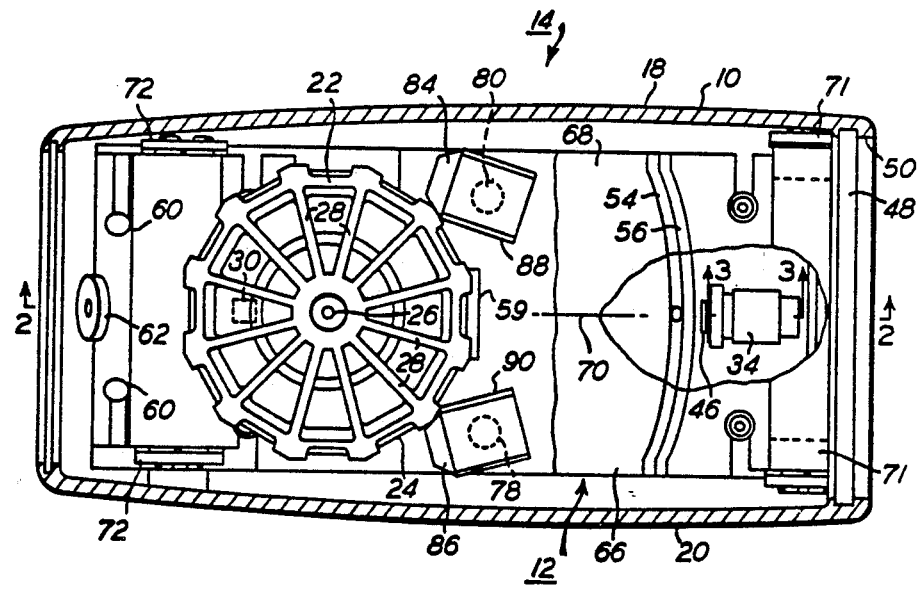
FIG. 1 is a sectional plan view of a hand-held bar code scanning and reading apparatus in accordance with the preferred embodiment of the invention; the section being taken along the line 1—1 in FIG. 2.
Figure 2:
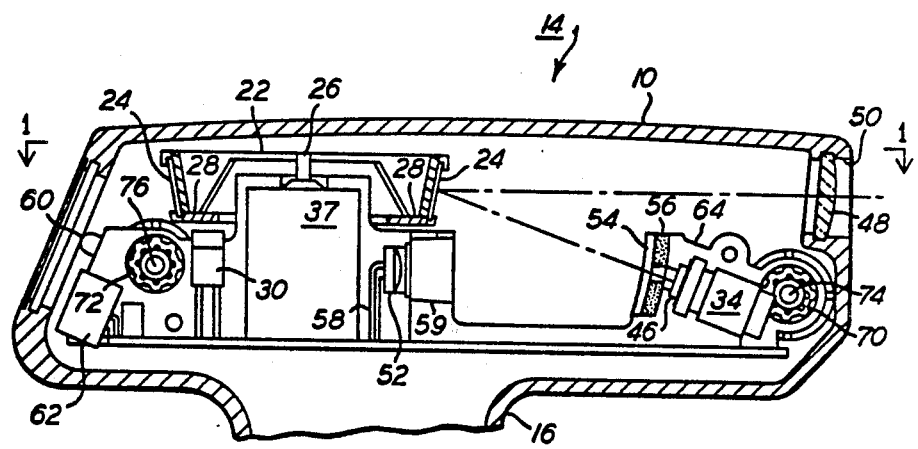
FIG. 2 is a fragmentary sectional view in elevation of the apparatus shown in FIG. 1, the section being taken along the line 2—2 in FIG. 1.
Figure 3:
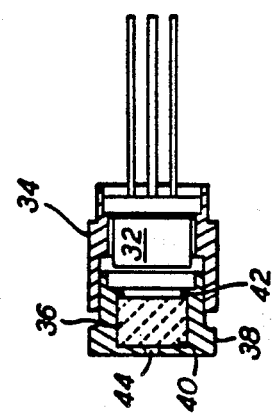
FIG. 3 is a sectional view showing the subassembly which includes the laser diode of the apparatus shown in FIGS. 1 and 2; the view being a sectional view taken along the line 3—3 in FIG. 1.

Referring to FIGS. 1, 2 and 3 there is shown a housing 10 which contains an assembly 12 having the optics which provides a hand-held bar code scanner and receiver 14. A handle 16, part of which is shown in FIG. 2, may be held by the hand of the operator. This handle can store the batteries for operating the scanner. The housing 10 may be made of plastic in two parts 18 and 20 which fit together to contain the optics and other components (e.g., circuit boards) of the scanner.

The optical beam is swept across the bar code by a deflector in the form of a rotating polygon 22 having a multiplicity of facets 24 which are inclined downwardly with respect to the axis of rotation 26 of the polygon. Twelve facets, for example, are provided. The facets and ribs 28 which extend radially with respect to the axis 26 and the facets define successive sectors of the polygon. Light is interrupted by these ribs. This light is provided from a "opto" 30, which is an opto-electronic device consisting of a light emitting diode and a transistor. The schematic representation of this opto 30 and of the polygon reflector 22 is illustrated in FIG. 16. The opto 30 is shown immediately below the polygon reflector 22. The signals from the opto may be used as synchronizing signals in the decoding of the bar code and for generating a gating control signal for applying power to a laser diode 32 contained in a tube 34. The system for generating the control signal and thereby operating the laser diode in a power conserving mode will be discussed hereinafter in connection with FIG. 16. The synchronizing signals may also be used to control the speed of a scan motor 37 which rotates the polygon reflector 22.

The tube 34, which contains the laser diode 32 also mounts, coaxially with the diode, a spherical focusing lens 36. This lens is mounted in an inner tube 38 against a step 40 and is held in place, indexed against the step 40, by a ring 42. The front end of the tube 38 is closed. The tube has an aperture 44 coaxial with the lens 36. The outer tube 34 may be crimped to hold the inner tube 38 and the lens 36 in place, at the proper distance along the axis of the tube, which is also the light path from the laser diode 32, to provide for focusing of the laser beam. The ray paths indicating the various focuses and focal planes of the lenses and other optical elements in the optical system of the scanner 14 will become more apparent hereinafter from FIGS. 4 and 5. The optical system which shapes the laser beam is an anamorphic system having the spherical lens 36, a first cylindrical lens 46 and a second cylindrical lens 48, which is the last lens of the system and provides a window in an opening or port 50 at the front end of the housing 10 through which the laser beam exits and into which the light scattered from the bar code enters the housing 10.

A photodetector 52 is responsive to the scattered light from the bar code. It is disposed behind a band pass filter 59 tuned to pass the laser wavelength. Polarizers may be provided next to the band pass filter and at the end of the laser tube 34 through which the beam passes to reduce the effect of specularly reflected light as disclosed in the above-referenced U.S. Pat. No. 4,603,262. The photodetector 52 is below the polygon reflector 22 and below the path of the light between the reflector 22 and the last cylindrical lens 48. The scattered light is reflected from the facets 24 of the polygon 22 onto a toric surface 54 of a light collecting reflector or mirror 56. The power of the reflecting surface 54 may be greater in the direction along the width thereof (generally vertically) than the direction along the length of the surface 54 (generally horizontal), so as to be complimentary to the shape of the beam at the bar code, which is oblong or elliptical due to the anamorphic optical system of the scanner 14. The powers of the toroidal surface are selected so that a non-anamorphic spot is incident on the detector. This improves the uniformity of the signal collected by the detector. An aperture (not shown) is desirably placed immediately in front of the photodetector for enlarging the depth of focus of the collection optics, as explained in the above referenced U.S. Pat. No. 4,603,262. This aperture may be rectangular, with its long axis parallel to the scan path. The leads 58 from the photodetector (which may be a phototransistor or photomultiplier) is connected to the circuit board which is mounted in the housing and provides an analog signal. This signal may be amplified so as to provide an analog signal output for decoding of the bar code.

Indicators such as one or more LEDs 60 and an audio transducer 62 (beeper) are mounted at the rear end of the housing 10. Various other displays (not shown) may be mounted in the rear end of the housing 10.

The foregoing elements of the scanner 10 may be mounted on a support structure 64 in the form of shells 66 and 68 which come together at a parting line 70 (see FIG. 1). The shells have indentations in which the tube 34, the motor 37, the photodetector 52, the cylindrical lens 46 and the collecting mirror 56 are nested. These components may be placed on one half shell (e.g., 66) which is then closed by the other half shell 68 of the structure 64. The components are mounted in assembled relationship in the housing 10 by cylindrical grommets 70 and 72 of rubber or other elastomeric material which provide shock absorbing characteristics. Pins 74 and 76 extend through these grommets 70 and 72 to capture the assembly contained in the shell support structure 64 within the housing. The last cylindrical lens 48 is captured in grooves in the outlet opening 50 from the housing.

The laser diode 32 provides a beam in the infrared wavelength range which is invisible to human operators. Accordingly a marker beam along a line or bar congruent with the scan path of the laser beam is generated utilizing a pair of LEDs 78 and 80 which are mounted in brackets 84 and 86 on the lower surface of the housing 10. A pair of vertical light pipes 88 and 90 extend to mirrors which reflect visible fan beams which overlap each other and fill the aperture of the last cylindrical lens 48. The cylindrical lens 48 forms these beams to a focus in the plane of the bar code along a line or bar congruent with and approximately centered with respect to the elliptical laser beam.

It will be noted that all scanning takes place before the last cylindrical lens which forms the long or major axis of the laser beam. The beam is incident upon the deflecting facets 24 at a small angle of incidence (e.g.

10° to the normal), due to the inclination of the facets 24 to the axis of rotation of the reflector 22. The beam is deflected substantially perpendicular to rotational axis of the deflector. Accordingly, scanning does not result in a large cross-scan error with respect to a linear scan path at the nominal plane of the bar code. The elliptical laser beam which scans the code will then be generally in alignment with the bars of the code over the entire length of the code including the bars at the beginning and end of the code. The system therefore has the ability to resolve fine bars and spaces even though the bars and spaces have blemishes.

Figure 4:
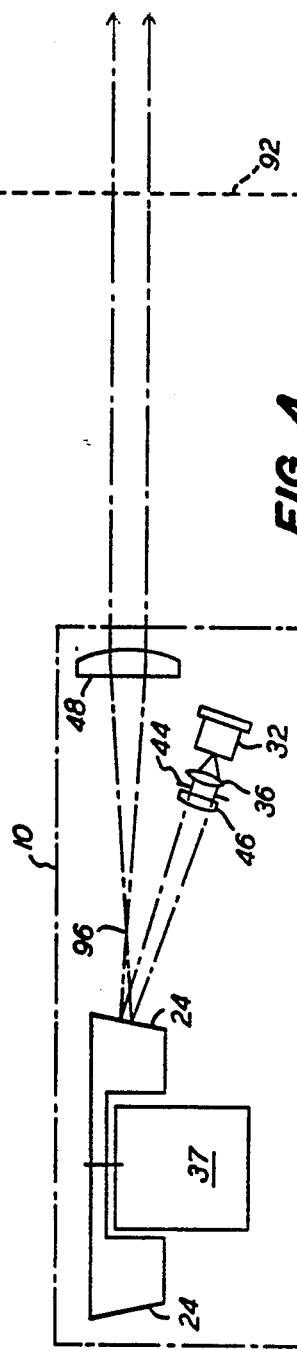
FIG. 4 is a simplified elevational or side view of the deflector and anamorphic optical system having ray paths showing how the system operates to form the astigmatic focus far beyond the nominal plane of the bar code.
Figure 5:
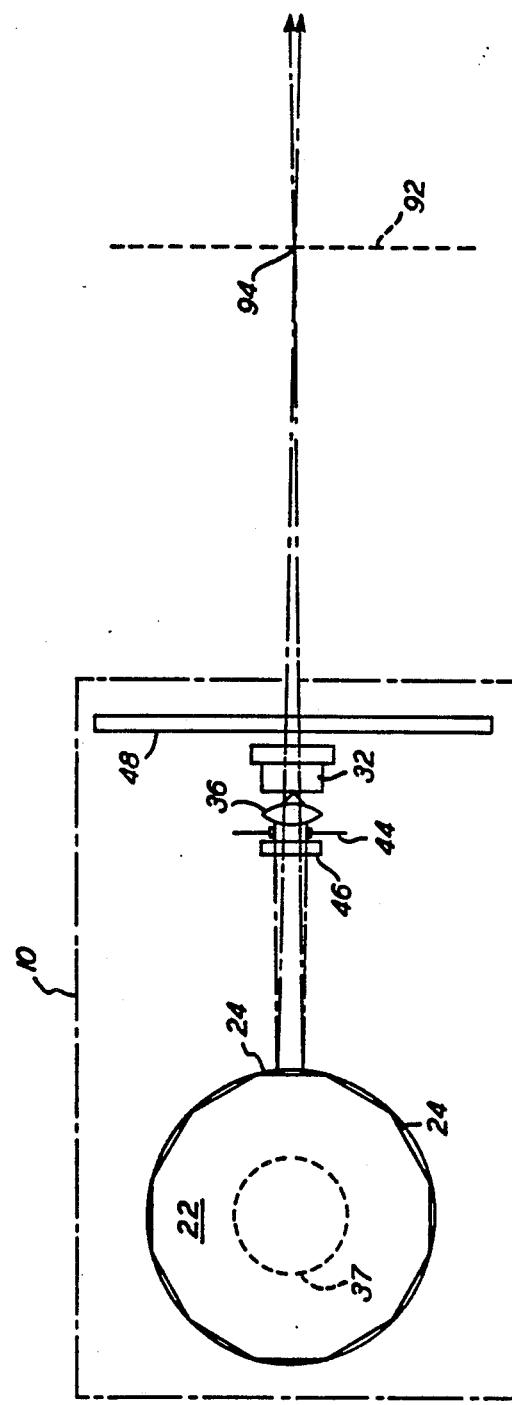
FIG. 5 is a plan view of the anamorphic optical system used in the apparatus shown in FIGS. 1, 2 and 3 having ray paths which show how the astigmatic focus in the nominal plane of the bar code is formed.

The operation of the anamorphic optical system in providing a laser beam which scans the nominal plane 92 of the bar code will become more apparent from FIGS. 4 and 5. The aperture 44 determines the F# of the system and is selected to be of a diameter which provides requisite spot size at the waist of the beam in the target or nominal plane of the code. The spherical lens 36 provides a first astigmatic focus 94 in the nominal plane 92 of the bar code. Thus in the horizontal direction, which is perpendicular to the bars of the code (the directions where the bars and spaces are resolved), the focus is at approximately the nominal plane of the code when the beam is aligned with the bars of the code. In obtaining this focus, the cylindrical lenses 46 and 48 do not take a part, since they have no power except in a direction along the major axis of the beam which is the vertical direction in FIG. 4. In the vertical direction (viz., along the length of the code bars), the cylindrical lenses 46 and 48 provide for two focii. The first cylindrical lens 46 focuses the beam at a focus 96 approximately one focal length of the last cylindrical lens 48 from that lens. Accordingly, the last cylindrical lens 48 essentially collimates the beam (or allows it to be slightly divergent). In effect the collimated beam has a focus well beyond (far to the right of) the nominal plane 92. Since the beam is not focused at the nominal plane in the vertical direction, but has an astigmatic focus well beyond the nominal plane 92, diffraction effects which would rotate the beam 90° as the plane of observation moves from left to right through the nominal plane 92, do not occur.

It will, therefore, be seen that an essentially circular beam enters the anamorphic optics thereby avoiding the problems involved in the use of an oblong beam ahead of the deflector 22. The use of the anamorphic optics also avoids diffraction effects which reduce the resolution of the scanner.

An anamorphic system of a spherical lens and two cylindrical lenses may also be used to provide the oblong or elliptical beam. The spherical lens may function as a collimating lens. The first cylindrical lens 46 may be used to form the focus in the horizontal plane instead of the spherical lens 36 as shown in FIG. 5. The first cylindrical lens would then have power in the horizontal direction. The cylindrical lens 46 may be provided without any power in the vertical direction and the spherical lens used to focus the laser beam one focal length away from the last cylindrical lens 48. This combination of powers also provides a beam having two asymmetric focii which are orthogonal to each other in the tangential and sagittal planes of the beam, one at the nominal plane 92 and the other far beyond that plane. The terms focus far beyond the plane of the code or second astigmatic focus also includes any optical effect which provides a diverging beam in the tangential plane of the beam.

Figure 7:
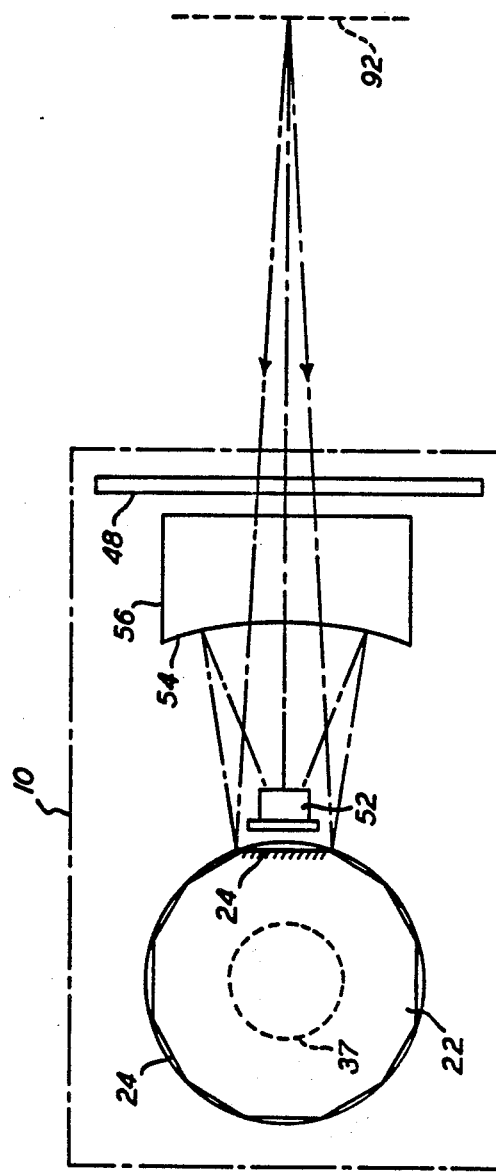

FIGS. 6 and 7 illustrate the operation of the optics in collecting scattered light from the bar code at the nominal plane 92. It will be seen that the toric surface 54 collects the light returning from the bar code which remains essentially of elliptical cross-section and focuses the light to a circular cross-section at the photosensitive surface of the photodetector 52. It will be observed from FIGS. 6 and 7 that the photodetector arrangement efficiently uses the space in the housing without interference with the projection of the laser beam to the bar code.

The generation of the marker beam along a line or bar congruent with the scan path of the laser beam in the plane 92 is illustrated in FIGS. 8 and 9. The LED projects a beam which is reflected from the mirror 91. The mirror is disposed so that the center of reflection is coaxial with the laser beam as it is deflected from the facets 24 of the polygon 22. The reflectors are angled towards the centerline of the optical system so as to provide overlapping fan beams. These beams fill the aperture of the last cylindrical lens 48. It may be desirable to provide a grating on the inside or outside of the cylindrical lens 48 and adjacent thereto to "smear" the output beam thereby providing a bar rather than line focus as shown at 98 in the horizontal direction at the nominal plane 92. Since a visible line or bar is provided which is congruent with the scan path and the center of which lies at the center of the scan path, the operator may readily locate the bar code so that it can be effectively scanned by the laser beam. The cylindrical lens 48 provides double duty in that it is involved in the generation of the elliptical or oblong cross-section of the laser beam (in its tangential plane) and in focusing the marker beam along the line or bar congruent with the laser beam's scan path.

It may be desirable to increase the depth of field by providing the facets 24 of the polygon with different optical power in the horizontal direction. Reference may be had to the Eastman and Boles patent No. 4,560,682 (above) for polygon systems which provide a longer depth of focus which may be both to the right and left of the nominal focal plane 92. In the event that such polygons are used, their facet surfaces will be toric and without power in the vertical direction so as not to interfere with the formation of the astigmatic focus well beyond the furthest plane in which the waist of the beam is focused in the horizontal direction. In this connection also, it is desirable that the focus 96 which is provided by the first cylindrical lens 46 be at the facets 24. Then the facet surfaces of the polygon can be spherical mirrors of different power.

FIGS. 10 and 11 show an anamorphic optical system using a combination of a cylindrical lens and two spherical lenses to produce the elliptical beam shape. The light from the laser diode 32 is nominally collimated by the spherical lens 36. This lens 36 has a small aperture and provides a uniform beam. The aperture 44 provides the beam from the spherical collimating lens with a circular cross-section. This beam is then made incident upon the deflector (viz., the facets of the polygon, the location of which is indicated by the dash line 24(a). The cylindrical lens 46 and the last lens 100 which is a spherical lens are spaced apart by the sum of their focal lengths and form an anamorphic lens pair. The cylindrical lens 46 as shown in FIG. 11 has no power in the vertical plane, which is along the length of the bar codes in the nominal plane 92. Thus, the laser beam is focused by the spherical lens to a point one focal length in front of that lens 100. The spot size is determined by the F number of the system, due to the aperture 44 which restricts the beam's cross-section as it exits the spherical lens. In the vertical plane, as illustrated in FIG. 10 the cylindrical lens 46 focuses a distance equal to the focal length of the spherical lens behind the spherical lens 100. The ratio of the beam diameter entering the cylindrical lens 46, $d_m$, to the length of the major axis of the beam exiting the spherical lens $d_M$ is given by $$d_m/d_M = f_M/f_m$$

where $f_M$ is the focal length of the cylindrical lens 46 and $f_m$ is the focal length of the spherical lens 100. It will be seen that the ratio relationships using two cylindrical lenses as shown in FIGS. 1 through 5 is similar.

FIGS. 12–15 illustrate another arrangement of optical elements to provide an anamorphic optical system which enables the scanning beam to have an oblong or elliptical cross-section. The deflector 22 has a plurality of facets, for example, 12, each of which with a toroidal reflecting surface 102. The beam from the laser diode 32 passes through an aperture 44 before entering the spherical lens 36. The first spherical lens 36 may be collimating or may have power so that, with the power of the toric reflecting surface 102, the laser beam is focused in the horizontal direction at the nominal plane 92 where the bar code is located. If the reflecting surface 102 is without power in the horizontal direction, then the power of the spherical lens 36 is increased to provide the focus in the horizontal plane as shown in FIG. 13 at the nominal plane 92 of the bar code.

In the vertical direction, the collimated or slightly diverging light from the spherical lens is collimated by the reflecting surface 102 of the polygon facets to a second astigmatic focus well beyond the nominal plane 92.

In the preferred form of the system shown in FIGS. 12 and 13 the spherical lens 36 and the reflecting surface 102 are nominally collimating. The cylindrical lens 40 provides the focus in the horizontal direction in the nominal plane 92 of the bar code. The cylindrical lens has no power in the vertical direction and the collimated beam reflected by the surface 102 passes through the cylindrical lens 48 and defines the major axis of the beam in its tangential plane at the nominal plane 92 of the code.

The photodetector 52 (see FIGS. 14 and 15) is disposed below the reflecting surface 102. Light is collected by a collecting lens 104 which may be a conventional spherical lens or a Fresnel lens. This lens may be toric so as to fully collect all of the light from the elliptical cross-section of the beam across its entire scan path.

Referring to FIG. 16 there is shown the system for conserving power in the operation of the scanning apparatus illustrated in the foregoing figures. The opto 30 has an LED 106 and a phototransistor 108. Light from the LED is reflected from the ribs 28 of the polygon 22. The ribs are made of black non-reflecting material so that during the passage of the ribs the light is absorbed and interrupted. The signal from the photodetector, which is illustrated at 110, reduces to low level while the reflecting ribs interrupt the light from the LED 106 to the phototransistor 108. During the period that the light is interrupted, the beam going to the nominal plane 92 of the bar code is outside of the scan path (between the limits of the path shown at a and b in the plane 92. This is because the spacial relationships in the optical system create the time relationships in the electrical signal 110.

The electrical signal is capacitively coupled to a clamp circuit 112 which clamps its lower level to a reference potential such as ground. The clamp signal is then amplified in a pulse amplifier 114 which operates a Schmidt trigger 116. The Schmidt trigger provides a binary signal which is illustrated as the sector signal as each facet rotates the beam through the scan path and successive paths ab, a'b', a"b". . . are scanned. The signal increases rapidly to high level. Between scans the signal is at low level. These signals are of equal duration when the polygon is rotating at constant speed, since each facet is of equal width. The sector signal from the Schmidt trigger is applied to a retriggerable one-shot (OS) 118 having a timeout period which is greater than the time duration of each segment (greater than the time ab and equal to the durations a'b', a"b". . . . Accordingly, so long as the polygon is rotating the Q output of the one-shot 118 will be high. This output is applied to an AND gate 120. The output of the Schmidt trigger is also applied directly to this gate 120. Accordingly, when the polygon is not rotating or is rotating at too slow a speed, the output of the AND gate 120 will be low. Similarly, the output of the AND gate is low when the laser beam is outside of the scan path (viz., when the ribs 28 interrupt the beam generated by the opto 30). In either case a switching amplifier 122 is enabled when the control signal from the AND gate is high and inhibited when the control signal is low. The operating power to the laser diode 32 from a source indicated as +V is gated-on only when the beam is sweeping along the scan path and not when the beam is outside of the scan path. The duty cycle of the laser is reduced and the amount of power consumed is decreased.

From the forgoing description it will be apparent that there has been provided improved bar code scanning and reading apparatus having features of operation not heretofore provided in the ability to resolve efficiently poorly printed and otherwise blemished bar codes and to facilitate the location of an invisible laser beam on the bar code, to effectively and efficiently collect scattered light from the bar code so that it may be converted into a signal from which the bar code can be decoded, as well as the ability to conserve power during operation. While a preferred embodiment and other embodiments of the system have been described, it will be appreciated that variations and modifications in the herein described system, within the scope of the invention will undoubtedly suggest themselves to those skilled in the art. Accordingly, the foregoing description should be taken as illustrative and not in a limiting sense.

I claim:

1. In a bar code scanning apparatus having a deflector which deflects an optical beam along a scan path in a nominal plane to intersect the bars of a bar code in said plane, the improvement comprising an anamorphic optical system having a plurality of optical elements for providing a first astigmatic focus in said plane and a second orthogonal astigmatic focus alignable generally paralleling the bars of said code and located far beyond said plane.

2. The improvement according to claim 1 wherein an aperture is provided at the entrance to said anamorphic optical system.

3. The improvement according to claim 1 wherein at least one of said first and second focii are provided by a pair of optical elements one of which is disposed a distance equal to its focal length from the focus of the other.

4. The improvement according to claim 3 wherein said focii are in planes in orthogonal directions, and said elements are lenses one of which is a cylindrical lens having power in one of said orthogonal directions to provide one of said focii.

5. The improvement according to claim 4 wherein said power of said cylindrical lens provides said second focus.

6. The improvement according to claim 1 wherein one of said elements is a cylindrical lens, said cylindrical lens having power in a direction to provide said first focus.

7. The improvement according to claim 1 wherein the cross-section of said beam in said plane is generally elliptical having its major axis in the tangential plane of said beam alignable in the direction of said bars and its minor axis in the sagittal plane of said beam orthogonal to said major axis, the length of said axes being given by $$d_M/d_m = f_M/f_m$$

where $d_M$ and $d_m$ are the length of said major and minor axes, respectively, and $f_M$ and $f_m$ are the focal lengths of said optical elements.

8. The invention according to claim 1 wherein said apparatus has means for providing a visible marker beam focused along a line congruent to said scan path, said marker beam providing means comprising one of the elements of said anamorphic optical system, said one of said elements being a cylindrical lens, and a source of visible light illuminating said lens.

9. The invention according to claim 8 wherein said cylindrical lens has a longitudinal axis said source comprising a pair of visible light producing elements providing beams of visible light overlapping each other along said longitudinal axis.

10. The invention according to claim 8 wherein said source of visible light is spaced beyond the focus of said cylindrical lens.

11. The improvement according to claim 1 wherein said plurality of optical elements comprising said anamorphic optical system is provided by first, second and third optical elements located successively between a source of said beam and said plane, said first element providing a spherical lens having said first focus and said second and third elements being first and second cylindrical lenses.

12. The improvement according to claim 11 wherein the focus of said first cylindrical lens is at the focal plane of said second cylindrical lens.

13. The improvement according to claim 12 wherein said deflector is located between said first and second elements.

14. The improvement according to claim 13 wherein said deflector is located at the focus of said first cylindrical lens.

15. The improvement according to claim 13 wherein said focus of said first cylindrical lens is beyond said deflector toward said second cylindrical lens.

16. The improvement according to claim 12 wherein an aperture is provided adjacent said first element.

17. The invention according to claim 11 wherein said deflector is a first reflector said source, said spherical lens and said first cylindrical lens being disposed adjacent each other on one side of said reflector for projecting said beam upon said reflector at an acute angle of incidence for reflection thereof at an acute angle of reflection towards said second cylindrical lens which is disposed on said one side of said reflector, a photodetector, a second reflector focusing light from said plane upon said photodetector, said second reflector being disposed between said first cylindrical lens and said first reflector and having an apperture therethrough for passage of said beam to be incident upon said first reflector.

18. The invention according to claim 17 wherein said first reflector is a rotatable polygon having an axis generally perpendicular to the longitudinal axis of said second cylindrical lens, said angle of reflection being perpendicular to the axis of rotation of said polygon a source of visible light disposed adjacent to said polygon and directed towards said second cylindrical lens to provide a line focus congruent with said scan path.

19. The invention according to claim 17 wherein said reflector is a rotatable polygon having an axis generally perpendicular to the longitudinal axis of said second cylindrical lens, said polygon having a plurality of reflecting facets, a plurality of ribs defining the boundaries of said facets, means responsive to light interrupted by said ribs for generating an electrical control signal, and means operated by said control signal for enabling said source to provide said beam of light when said facets are in position to deflect said beam across said scan path thereby conserving power for operating said source.

20. The invention according to claim 19 wherein said source is a laser.

21. The invention according to claim 17 further comprising a housing, a support structure in which said reflector said first cylindrical lens, said spherical lens, said reflector, and said photodetector are disposed in assembled relationship, said support structure being mounted in said housing.

22. The invention according to claim 21 further comprising an opening in said housing, said second cylindrical lens being mounted in said housing across said opening to define an exit port for said beam and an entry port for light from said code.

23. The improvement according to claim 1 wherein said deflector has power which provides said first focus and said second focus is provided by a cylindrical lens beyond said deflector toward said plane.

24. The improvement according to claim 23 wherein said deflector is a reflector having a plurality of facets each with a surface having different power to provide said first focus in said plane with one of said plurality of facets and in a plurality of other planes at different spacings therefrom with others of said plurality of facets, and a cylindrical lens for providing said second focus.

25. The improvement according to claim 24 wherein said facets are spherical reflectors and said cylindrical lens has its focal plane where said facets reflect said beam.

26. The improvement according to claim 24 wherein said facets are reflectors which have toric surfaces of different power in orthogonal directions.

27. The improvement according to claim 1 wherein said plurality of elements include first, second and third elements and said first element provides a first spherical lens, said second element provides a cylindrical lens, and said third element provides a second spherical lens, said first spherical lens collimating said beam, said cylindrical and second spherical lens providing said second focus, and said second spherical lens providing said first focus.

28. The improvement according to claim 27 wherein said deflector is located between said first spherical lens and said cylindrical lens.

29. In a bar code scanning system having a deflector which scans an optical beam across a bar code, an optical system for providing a beam having an oblong cross-section with its long axis along its tangential plane and its short axis along its sagittal plane so that the long axis of the beam is alignable with the bars of said code, said optical system comprising first and second optical elements along the path of said beam from a source thereof to the bar code, said first element focusing said beam to define the short axis of said oblong cross-section in the vicinity of said bar code, said second element enabling said beam to be collimated or divergent to define the long axis of its oblong cross-section, and said second element being disposed between said deflector and the vicinity of said bar code.

30. The system according to claim 29 including a third element for providing a focus along the long axis, said third element being spaced about one focal length of said second element from said second element toward said source.

31. The system according to claim 30 wherein said deflector is disposed between said third element and said second element.

32. The system according to claim 30 wherein said first element provides a spherical lens and said second and third elements are cylindrical lenses having power only along said long axis.

33. The system according to claim 30 wherein said first element is a spherical lens disposed along said path between said deflector and the vicinity of said code, and said second element is a cylindrical lens having power only along said long axis and being disposed with the focus thereof at the focal plane of said spherical lens, and said third element being a spherical lens collimating said beam from said source and providing said beam to said cylindrical lens.

34. The system according to claim 29 wherein at least one of said first and second elements has power in a direction along only one of said long and short axes.

35. The system according to claim 34 wherein said one element is a cylindrical optical element.

36. The system according to claim 35 wherein said cylindrical optical element has power in the direction of said long axis, a visible marker beam source disposed to be focused by said cylindrical element along a line congruent with the scan path of said optical beam in the vicinity of said code.

37. The invention according to claim 29 further comprising a photodetector, a reflecting optical element presenting a reflecting surface having different power along said long and short axes to define a path for light due to said optical beam from the vicinity of said code via said deflector to said photodetector, said reflecting optical element being disposed along the path of said optical beam between said source and said deflector, said reflecting optical element having an aperture through which said optical beam passes.

38. The system according to claim 29 wherein an aperture is provided between said source and said deflector.

39. The system according to claim 29 wherein said first element is a reflector provided by at least one spherical lens and said deflector, and said second optical element being the other of said spherical lens and said deflector, and a third optical element being a cylindrical lens having power along said long axis.

40. The improvement according to claim 29 wherein said first element is a cylindrical lens having power along said short axis and being disposed between said deflector and the vicinity of said code, said second element being provided by at least one of a second spherical lens and a toroidal reflecting surface on said deflector.

41. In a bar code scanner in which an invisible laser beam is scanned along a line across the bars of a code in a nominal plane in which the bars of said code are disposed, a marker beam system which comprises a cylindrical lens which faces said plane on one side thereof for providing a focus along a line generally congruent with the line along which said invisible beam is scanned, and source projecting visible light toward said cylindrical lens and being spaced from the focus of said cylindrical lens on the side thereof opposite to said one side.

42. The marker beam system according to claim 41 wherein a plurality of sources of visible light are provided which define overlapping fan beams incident upon said cylindrical lens.

43. The system according to claim 41 wherein a rotating deflector for scanning said beam is provided disposed opposite to said cylindrical lens, said source of visible light being disposed at opposite sides of deflector.

44. The system according to claim 41 wherein said deflector is a polygon having a plurality of reflecting facets, said polygon being rotatable about an axis, said facets projecting said optical beam along a path generally perpendicular to said axis toward said lens, said source of visible light projecting said visible light along a path generally paralleling said axis, and the reflecting mirror for projecting said visible light along a path generally perpendicular to said axis to said lens.

45. In a hand-held bar code scanner having a source providing a beam which is scanned along a scan path of certain length across said code when power is applied to said source, apparatus for conserving said power which comprises a rotating beam deflector having a plurality of facets each of which deflects said beam along said scan path, said deflector having a plurality of ribs defining the limits of said facets, means including said ribs for providing a binary optical control signal having different states depending upon whether said beam is being deflected along said scan path, and means for enabling and inhibiting the supply of power to said source and response to said control signal.

46. The apparatus according to claim 45 wherein said control signal generating means comprises opto-electronic means having a light path, said ribs being moveable through said light path, and signal processing means connected to said opto-electronic means for generating said control signal.

47. The apparatus according to claim 45 wherein said deflector is a polygon reflector, said ribs extending radially from the axis of rotation of said polygon to define with said facets successive sectors of said polygon.

* * * * *